US006394259B1

(12) United States Patent
Alhainen

(10) Patent No.: US 6,394,259 B1
(45) Date of Patent: May 28, 2002

(54) FEED ROLLER

(75) Inventor: Paavo Alhainen, Tolosenmäki (FI)

(73) Assignee: Ponsse Oyj, Vierema (FI)

( * ) Notice: Subject to any disclaimer, the term of this patent is extended or adjusted under 35 U.S.C. 154(b) by 0 days.

(21) Appl. No.: 09/509,354

(22) PCT Filed: Sep. 24, 1998

(86) PCT No.: PCT/FI98/00751

§ 371 (c)(1),
(2), (4) Date: Mar. 27, 2000

(87) PCT Pub. No.: WO99/16597

PCT Pub. Date: Apr. 8, 1999

(30) Foreign Application Priority Data

Sep. 26, 1997 (FI) ................................................. 973811

(51) Int. Cl.[7] ................................................ B65G 15/44
(52) U.S. Cl. ..................................... 198/692; 144/248.6
(58) Field of Search ....................... 198/692; 144/248.6, 144/248.3, 250.1, 246.1

(56) References Cited

U.S. PATENT DOCUMENTS

| | | | | |
|---|---|---|---|---|
| 2,983,291 A | * | 5/1961 | Dick | 144/242 |
| 3,202,267 A | * | 8/1965 | Watters | 198/200 |
| 3,356,205 A | * | 12/1967 | McLeod | 198/162 |
| 3,559,796 A | * | 2/1971 | Marks | 198/173 |
| 3,570,648 A | * | 3/1971 | Gillespie et al. | 198/25 |
| 3,608,700 A | * | 9/1971 | Nilsson | 198/179 |
| 3,687,271 A | | 8/1972 | Lindblom | 198/167 |
| 3,858,713 A | * | 1/1975 | Allen | 198/200 |
| 4,385,650 A | * | 5/1983 | Schmidt | 144/246 C |
| 4,508,149 A | * | 4/1985 | Carroll | 144/245 |
| 4,603,718 A | * | 8/1986 | Hutson | 144/208 E |
| 4,886,156 A | * | 12/1989 | Records et al. | 198/692 |
| 4,901,778 A | * | 2/1990 | Fenton | 144/230 |
| 5,152,328 A | * | 10/1992 | Arvidsson | 144/246 A |
| 5,996,658 A | * | 12/1999 | Alhainen | 144/250.17 |
| 6,202,719 B1 | * | 3/2000 | Ketonen | 144/24.13 |

FOREIGN PATENT DOCUMENTS

| | | |
|---|---|---|
| EP | 0 478 522 B1 | 4/1992 |
| EP | 0 822 039 A1 | 2/1998 |
| FI | 54244 | 7/1978 |
| FR | 848.784 | 11/1939 |

* cited by examiner

*Primary Examiner*—Christopher P. Ellis
*Assistant Examiner*—Rashmi Sharma
(74) *Attorney, Agent, or Firm*—Young & Thompson

(57) ABSTRACT

A feed roller for use in feeding timber includes a body and has disposed around its periphery friction elements with anti-slip elements for improving the engagement between the feed roller and the log. A transfer element is arranged between the friction element and the body to transfer the motion of the feed roller to the friction element. The friction element swings around a pitch point formed in the transfer element, adhering to the surface of the log conveyed in the device and always directing an even pressure to the surface of the log. The transfer element preferably includes lugs, which are disposed in grooves at the bottom of the friction element.

17 Claims, 3 Drawing Sheets

FEED ROLLER

BACKGROUND OF THE INVENTION

The present invention relates to a feed roller for use in feeding timber, the feed roller comprising a body having disposed around its periphery friction elements comprising anti-slip elements for improving the engagement between the feed roller and the log, the friction element comprising at least one coupling means for arrangement thereof to the body, and a transfer means for transferring the rotational motion of the feed roller to the friction element.

Feed rollers of this kind are generally used in harvesters. In this context, a feed roller refers to a roller directing both a pulling and pushing motion to the log e.g. in such a harvester. Consequently, a drive wheel, feed wheel or roller wheel may be involved. Generally known feed roller techniques include fixed wheels mostly made of steel, and wheels containing different kind of drive elements and rubber mixtures.

Fixed rollers used as feed rollers usually consist of a cylinder and various almost immobile anti-slip elements attached thereto. These are easy to manufacture, but because of an unfavourable distribution of surface tension, they easily damage the surface of the log. With increasing mechanical harvesting, surface damage to the timber has become an increasingly important factor in the economic use of timber.

Feed rollers of this kind comprising anti-slip elements articulated to the feed roller are disclosed in publications EP 0 478 522 and Fl 54244, for example. To enable a small swinging motion of the anti-slip element, dampers made of a rubber material are disposed in connection with, preferably between, the anti-slip elements according to EP 0 478 522, for example.

However, previous solutions have drawbacks which have so far not been solved. Accordingly, the anti-slip elements of feed rollers have usually been arranged to follow the motion of the surface of the feed roller. This makes the anti-slip elements dig into the surface of the log being conveyed, causing unfavourable damage to the surface during harvesting.

Furthermore, providing the feed roller with rubber dampers causes problems as the dampers bind some of the feeding energy directed to the log by the feed roller, resulting in an increased need for feed force. Increased use of force, in turn, increases the surface pressure of the feed roller, causing unfavourable heating to the roller and its rubber coating. Heating of the roller, in turn, leads to changes in roller dimensions, causing inaccuracy to the measurement of the logs. Heating of the roller and the rubber, in particular, reduces the service life of rubber rollers. This results in impaired grip characteristics, and the roller coating has to be renewed repeatedly. Besides being expensive, such renewal of the coating causes unnecessary idle periods to valuable machinery.

FI54244 differs from other solutions in that the friction elements of the feed roller are arranged to swing along the surface of the fed timber. However, such articulation of the feed roller is structurally difficult to implement to ensure a sufficient strength.

SUMMARY OF THE INVENTION

It is an object of the present invention to eliminate prior art drawbacks and provide a completely new kind of solution providing better friction properties and a more even feeding motion that previously. It is a further object of the invention to provide a feed roller without harmful wear characteristics of rubber-coated wheels, resulting in longer maintenance intervals.

This object is achieved by the feed roller having the characteristics of the present invention as defined in the claims. To be more exact, the device of the present invention is mainly characterized in that preferably the periphery of the transfer means comprises lugs which are disposed in grooves at the bottom of the friction element.

The invention is based on the idea of avoiding the damaging impacts directed to the surface of a log and the abrasive motion caused by the anti-slip element to the surface when the feed roller rotates. This is accomplished by attaching the friction elements, provided with anti-slip elements, rotatably to the body so that as many anti-slip elements as possible are constantly in contact with the surface of the log. The abrasive motion can be further reduced by a mechanical coupling between the friction elements.

The turning of the friction element caused by the traction force of the log does not have to be limited or even necessarily dampened by e.g. rubber if the rotation axis of the swinging motion between the friction element and the body is placed preferably in the vicinity of that surface of the friction element which faces the log. In this case the friction element is immobile during feeding with respect to the surface of the log.

The structure of the feed roller according to the invention provides significant advantages. The arrangement of at least two arrays of anti-slip elements on the surface of the friction element enables a greater number of arrays of anti-slip elements than usual to be constantly in contact with the surface of the log. The anti-slip elements of the invention are also immobile with respect to the surface of the log when the feed roller is rotating, the entire surface of the friction element resting against the surface of the log. Similarly, the entire surface of the friction element is detached substantially simultaneously. This naturally provides a significant improvement compared with fixed anti-slip elements in a feed roller. In the most disadvantageous situation only one array of anti-slip elements is in contact with the surface of the log being conveyed, the anti-slip elements hitting and damaging the surface of the log. The present invention also avoids the penetration by the anti-slip elements of conventional feed rollers of the surface of the log during harvesting. This way excessive damage to the surface of the log can be avoided and consequently as high a market value for the timber as possible can be maintained.

With a significant friction element turning radius, the device of the invention provides a feed roller having an even surface pressure even at lumps and other roughness on the surface of the log.

The radius of the feed roller is always substantially constant, since the friction element of the invention does not have to be mobile in the direction of the radius of the feed roller. This allows measurement of various magnitudes, such as thickness, of the log from the control mechanisms of the feed rollers. This also provides a feed roller whose measurement accuracy shows no substantial variations caused by temperature changes.

Furthermore, the friction elements of the feed roller of the invention are more simple to repair, even by the user alone, resulting in significant savings in maintenance costs.

BRIEF DESCRIPTION OF THE DRAWINGS

In the following the invention will be described in greater detail by means of the attached drawings, in which.

DESCRIPTION OF THE PREFERRED EMBODIMENTS

Figure 1:
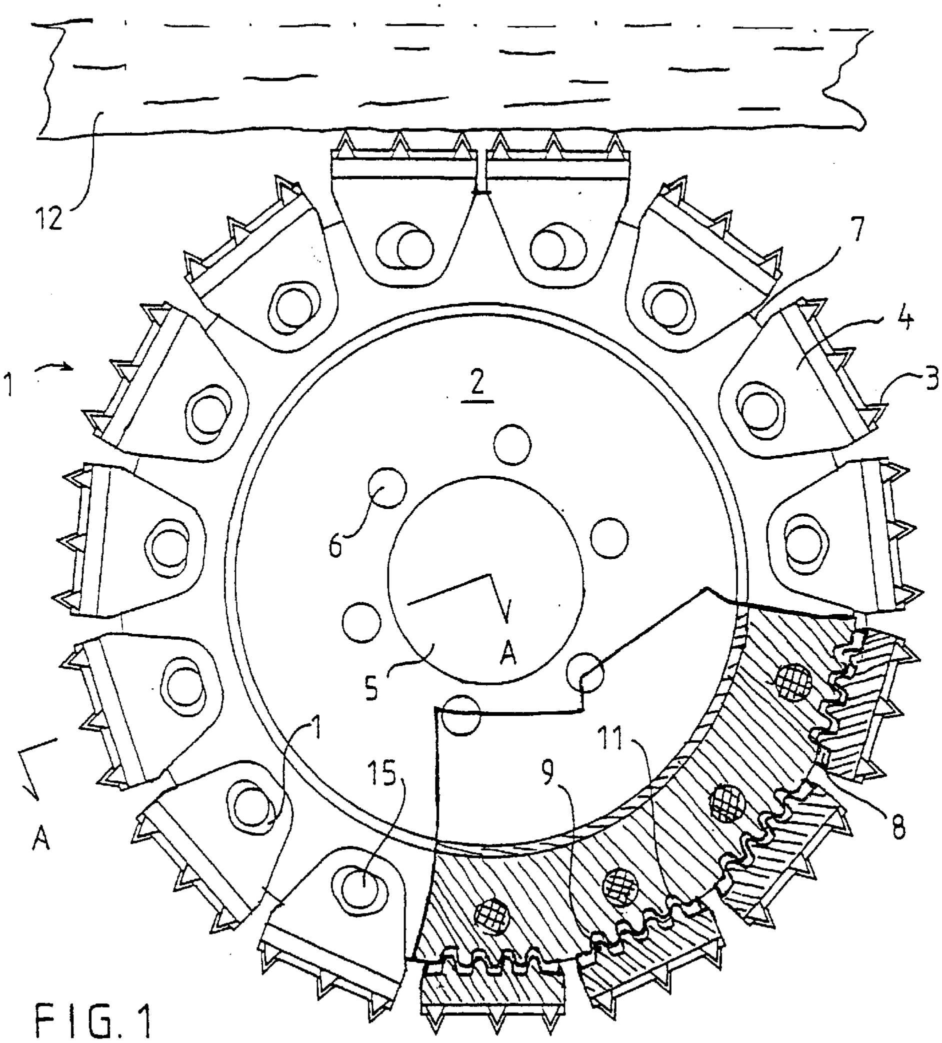
FIG. 1 is a side view of an embodiment of the feed roller of the invention in partial cross-section.

FIG. 1 shows a preferred embodiment of the feed roller of the invention. Such a feed roller 1 comprises a body 2 and friction elements 4 coupled thereto and provided with anti-slip elements 3.

The body 2 is preferably made from steel plate and is shaped substantially as a circular plate, but may also be shaped as e.g. a circular cylinder or a polygon. In the middle the body comprises a hole 5 to accommodate a steering shaft coupled to an engine controlling the feed roller, and mounting holes 6 for mounting the body to the shaft.

The friction elements 4 are arranged at the periphery 7 of the body 2, the friction element being connected to the body by coupling means and being arranged to follow the rotational motion of the body. A transfer means 8, disposed between the periphery of the body and the friction element, is arranged to control the friction element in the tangential direction of the body and to prevent an abrasive reciprocating motion directed to the log. Said transfer means comprises mechanical grip means, such as lugs 9 at the periphery, e.g. a toothing, and grooves 11 at the bottom 10 of the friction element for accommodating the lugs. In this case the width of the periphery is preferably arranged to substantially correspond to the width of the bottom of the friction element.

As a result of the above, with the feed roller rotating, the friction element is connected by a mechanical grip to the body of the feed roller and is forced to follow substantially the same point of the periphery of the body. When contacting the surface of a log 12 fed into the device, the friction element is arranged to swing along the periphery of the body in the direction of the surface of the log, whereby as many anti-slip elements as possible grasp simultaneously the surface of the log, while the transfer means continues to control the friction element without sliding in the tangential direction of the rotation of the feed roller.

The lugs 9 of the transfer means are preferably arranged on a circular arc which is substantially parallel with respect to the circular periphery 7 of the body. If the body comprises a polygon, the lugs are preferably arranged on a circular arc forming at least a local convex surface with respect to the periphery of the body. In addition to the drive of the friction element 4, this provides a pitch point around which the friction element is arranged to swing, the pitch point being substantially immobile in the radial direction of the feed roller.

A preferred embodiment of the transfer means 8 of the invention comprises involute gear teeth to be used in e.g. cogwheels. In such a toothing the perpendicular distance between the friction element 4 in the pitch point and the midpoint of the feed roller 1 is substantially constant during the entire rotational motion, while the teeth roll (not slide, as usual) with respect to one another. The use of such involute gear teeth in a transfer means substantially decreases the wear as compared with other forms of toothing.

Figure 2:
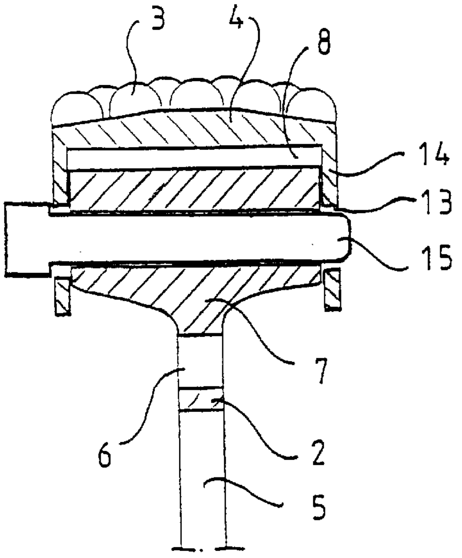
FIG. 2 shows a detail of the friction element of a feed roller according to FIG. 1 taken on the line A—A.

In the device of the invention the friction element 4 is movably connected to the body by coupling means. The coupling is preferably implemented by a slot/pin coupling in accordance with FIG. 2. In the embodiment of the figure, the slot 13 is disposed in flanges 14 at the edge of the friction element and projecting therefrom, the pin 15 which couples the friction element to the body of the feed roller being disposed at the periphery of the feed roller.

Figure 4:
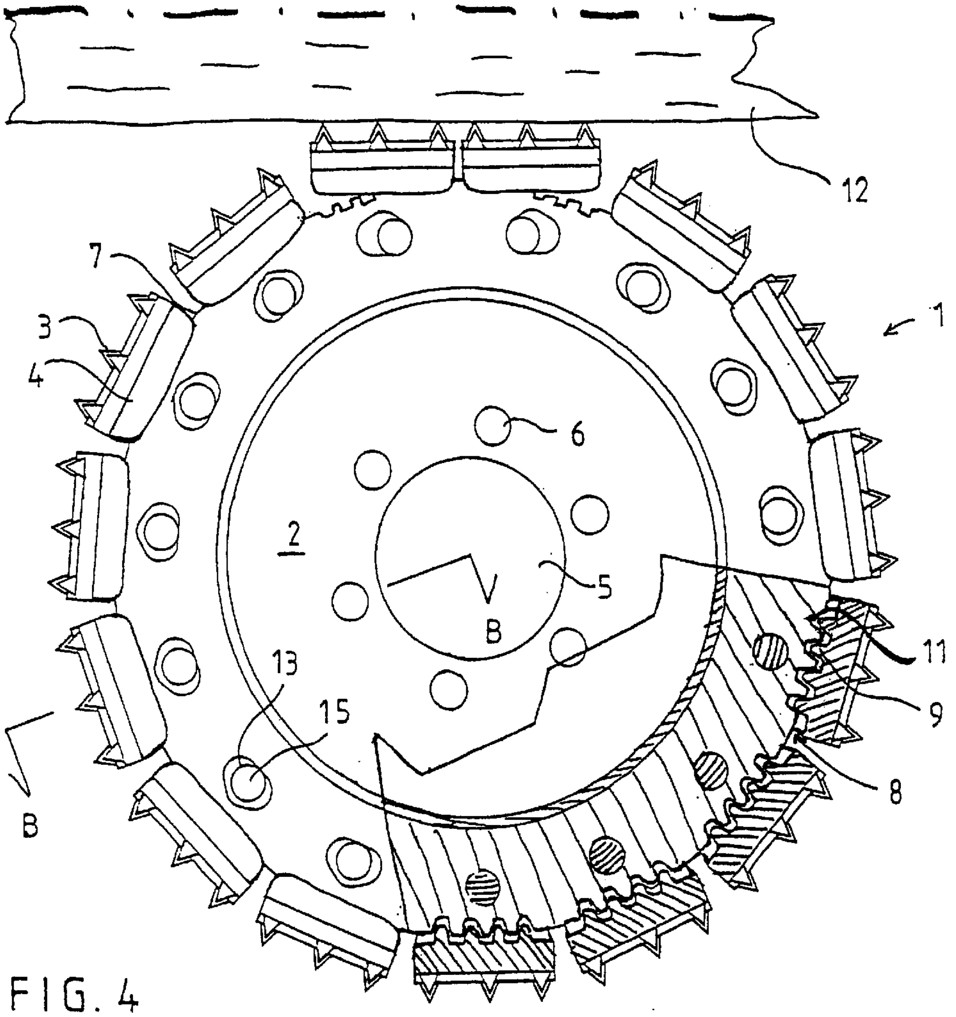
FIG. 4 is a side view of a second embodiment of the feed roller of the invention in partial cross-section at the level of the transfer means.
Figure 5:
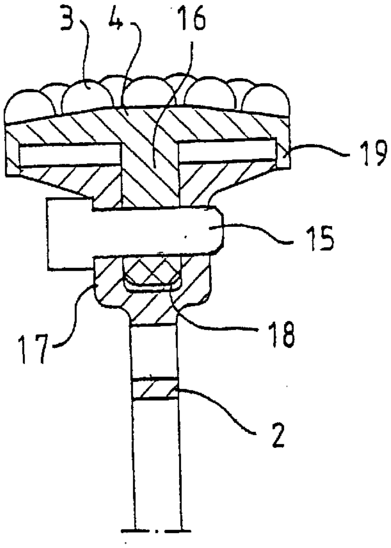
FIG. 5 shows a detail of the friction element of a feed roller according to FIG. 4 taken on the section B—B.

In the embodiment of FIGS. 4 and 5, the friction element 4 comprises at least one rigidly arranged projection-like mounting means 16, which is preferably attached to at least one groove means 17 disposed at the periphery 7 of the body in accordance with FIG. 5. Such a groove means comprises elements projecting from the periphery, between which a groove 18 forms, opening upward from the feed roller. In such an embodiment, the lugs 9 of the transfer means 8 of the invention are disposed at the ends of the projecting elements of the groove means. With the mounting means of the friction element being arranged in the groove, the slot 13 in turn is arranged in the mounting means and the pin 15 is coupled to the groove means. Such a pin preferably comprises a bolt to be screwed to the mounting means.

The broad joint between the friction element 4 and the body 2 enables the friction element to move substantially at the rotational level of the feed roller 1. In this case the friction element 4 can swing around its pitch point as the pin 15 slides in the slot 13. In this way the friction element is arranged to adhere to the surface of the log conveyed in the device and to always direct an even pressure to the surface of the log. Thus the mounting means does not serve to receive any kind of forces in a state of load, it only keeps the friction element in position at the periphery of the body.

Figure 6:
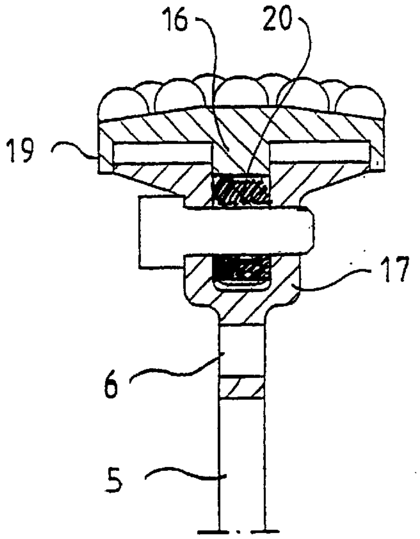
FIG. 6 shows a detail of a second embodiment of the friction element of a feed roller according to FIG. 4 taken on the section B—B.

The groove means 17 shown in FIGS. 5 and 6 can be arranged to move around the entire periphery 7 of the body and to receive all the friction elements 4 arranged at the periphery. It is also feasible to have a separate groove means for each friction element. With a cylindrical body, the groove means can be arranged side by side on the outer surface of the cylindrical housing.

Figure 3:
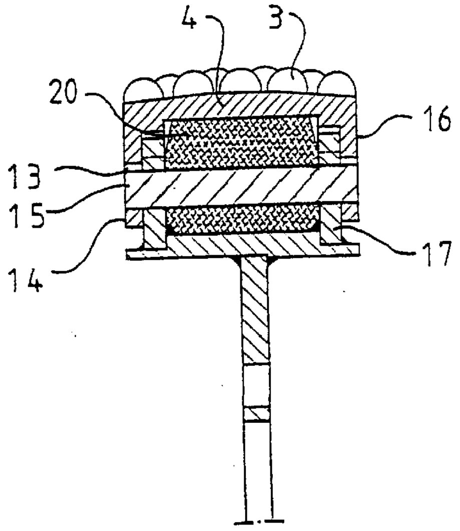
FIG. 3 shows a detail of a second embodiment of the friction element of a feed roller according to FIG. 1 taken on the line A—A.

The mounting means 16 can be disposed in the groove 18 comprised by the groove means 17 as shown in FIG. 5 or 6, or arranged to surround the groove means from its two opposite sides as shown in FIG. 3.

When the mounting means 16 is provided by the projection arranged in the groove 18 of the groove means 17 as shown in FIG. 5 or 6, the friction element 4 further comprises support flanges 19 at the edges that are parallel with respect to the rotational direction of the feed roller 1, whereby the friction element is of the shape of two downward opening U:s next to each other, as shown in the figures. On the one hand, such a support flange 19 prevents impurities from entering the transfer means 8 and, on the other hand, it supports the friction element in the groove means, preventing it from turning.

The friction element 4 of the invention can also be provided with damping, as shown in FIGS. 3 and 6. Such damping preferably comprises a damping element 20 made of rubber and disposed in the groove of the groove means 17. In this case the damping element rests on the bottom 10 of the friction element and on the periphery 7 of the feed roller or on the bottom of the groove means disposed therein, thus preventing the free friction elements, which at that moment are not pressed against the surface of a log, from swinging in the feed roller 1 at its periphery. This avoids the disturbing rattle usually caused by friction elements and the disadvantageous vibration caused by the swinging friction elements to the feed roller. Such a damping element 20 also prevents impurities from entering between the friction element and the groove means, and directs the following friction element to the right position with respect to the surface of the log 12 to be conveyed.

The figures show that the anti-slip element arrays of at least one friction element 4 are constantly in contact with the surface of the log 12. Such anti-slip elements 3 include e.g. teeth or ridges. In the solution of the invention, the anti-slip element arrays of as many as two friction elements are in contact with the log most of the time. When the feed roller 1 rotates, these arrays do not slip with respect to the surface of the log.

Figure 7:
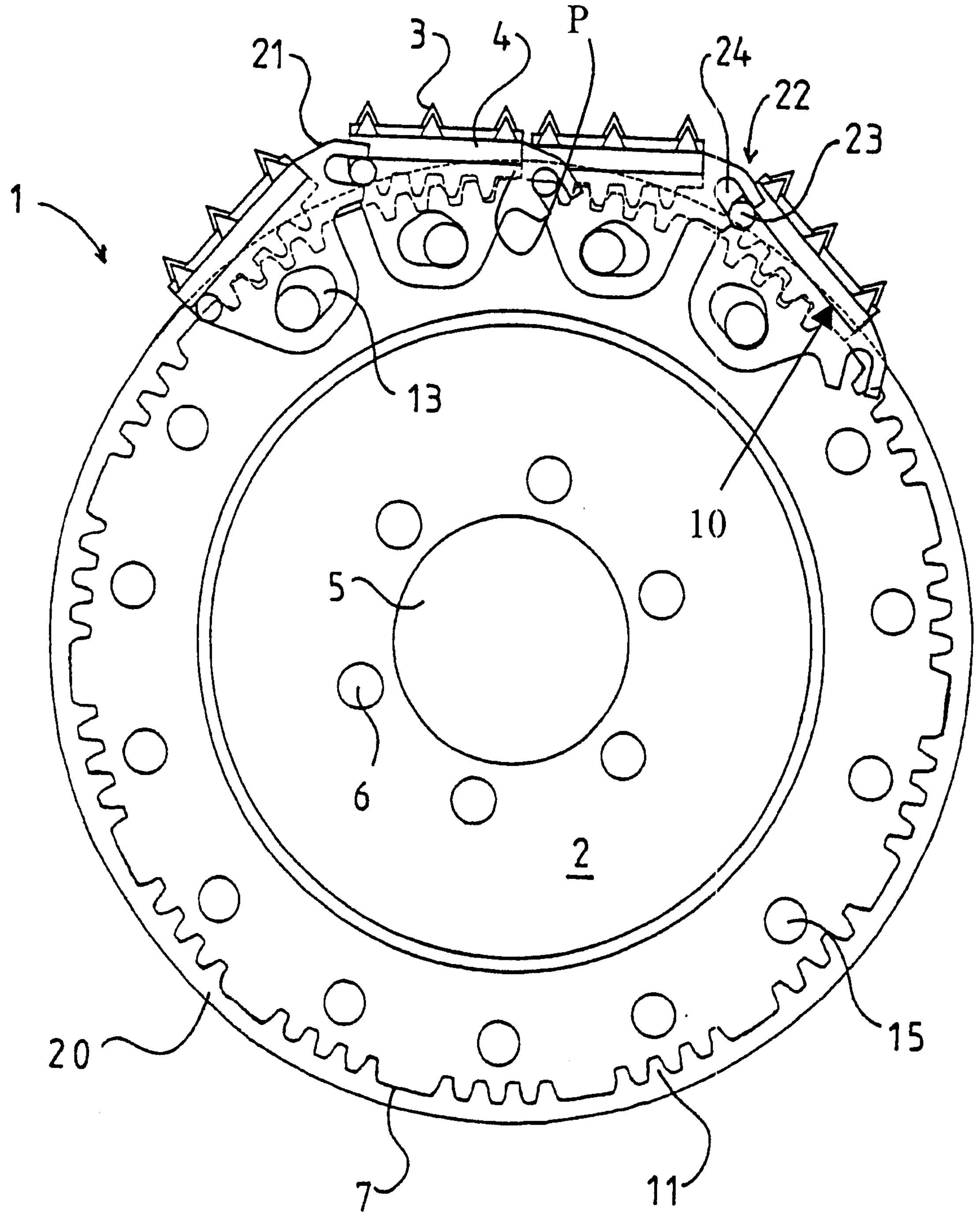
FIG. 7 shows an embodiment of a feed roller of the invention, provided with coupled-up friction elements.

FIG. 7 shows another preferred embodiment of the invention. The friction elements 4 are coupled together mechanically in the feed roller 1, and the friction element on the surface of the log 12 is arranged to guide the following friction element so that it contacts the surface of the log at the right angle when the feed roller is rotating. In this way the front edge 21 of the friction element or the anti-slip element 3 on the surface of the friction element does not hit the surface of the log in the usual manner, digging into it and damaging it. Instead, the friction element immediately places itself substantially in the direction of the surface of the log, using the maximum area to grip the log. Such mechanical coupling between the friction elements 4 thus efficiently prevents harvesting damage.

In the device shown in FIG. 7, the coupling means 22 employed for the mechanical coupling of the friction elements 4 comprises a slot/pin arrangement. In this case the sectional plane of the friction element in its rotational direction comprises coupling elements 23 and 24 at opposite ends of the friction element. In other words, one end of the friction element comprises a pin 23 and the opposite end comprises a slot 24 for receiving the pin of the adjacent friction element. The coupling elements are preferably arranged transversely with respect to the rotational direction of the feed roller 1 and form the fulcrum between the friction elements.

The friction elements 4 can also be coupled together by a flexible wire-like coupling means, a claw coupling, or another machine element known per se, to achieve a mutual control motion.

It is to be understood that the foregoing description and the related figures are only intended to illustrate the present invention. It is obvious that the invention is not restricted only to the above description or the embodiment disclosed in the claims, but it will be apparent to those skilled in the art that many variations and modifications may be made to the present invention without departing from the inventive idea defined in the attached claims.

What is claimed is:

1. A feed roller for feeding timber, the feed roller comprising:

a body having disposed around its periphery friction elements comprising anti-slip elements for engaging a log;

each of said friction elements comprising at least one coupling means for connection thereof rotatably to said body and a transfer means for transferring rotational motion of the feed roller to the respective one of said friction elements;

said transfer means comprising lugs arranged at a periphery of said body, said lugs being disposed in grooves at bottoms of said friction elements; and each of said friction elements being arranged to turn around a pitch point in said transfer means, the pitch point being substantially immobile in the radial direction of the feed roller while said transfer means are arranged to roll with respect to one another, whereby each of said friction elements adhere to a surface of a log conveyed in the feed roller and directs an even pressure to the surface of the log.

2. The device as claimed in claim 1, wherein said lugs and said grooves form a toothing at said periphery of said body and at said bottom of said friction elements.

3. The device as claimed in claim 1, wherein said lugs comprise involute gear teeth.

4. The device as claimed in claim 1, wherein said lugs are arranged on a circular arc that is parallel to said periphery of said body.

5. The device as claimed in claim 1, wherein said coupling means comprises mounting means for mounting said friction elements movably to said body, said mounting means being coupled by a loose slot and pin coupling to said periphery of said body.

6. The device as claimed in claim 5, wherein said mounting means is disposed in a groove formed by two parallel projecting elements at said periphery of said body.

7. The device as claimed in claim 6, wherein said groove extends entirely around said periphery and receives all said friction elements.

8. The device as claimed in claim 5, wherein said mounting means comprises parallel flanges on opposite sides of said periphery.

9. The device as claimed in claim 1, further comprising a damping element between said friction elements and said periphery.

10. The device as claimed in claim 1, further comprising linking means for mechanically linking said friction elements together.

11. The device as claimed in claim 10, wherein said linking means comprises a pin at one end of each of said friction elements and a slot at an opposite end of said friction element for receiving said pin of an adjacent one of said friction elements, said linking means being arranged transversely with respect to a rotational direction of the feed roller and forming a fulcrum between said friction elements.

12. A feed roller for feeding timber, the feed roller comprising:

a body having disposed around its periphery friction elements comprising anti-slip elements for engaging a log, said body having lugs in said periphery;

each of said friction elements being coupled rotatably to said body by a loose slot and pin coupling that permits tangential movement of said friction elements on said periphery;

each of said friction elements having a bottom with grooves that engage said lugs to transfer rotational motion of the feed roller to the respective one of said friction elements;

each of said friction elements being arranged to turn around a pitch point that is substantially immobile in the radial direction of the feed roller, whereby each of said friction elements adhere to a surface of a log conveyed in the feed roller and directs an even pressure to the surface of the log.

13. The device as claimed in claim 12, wherein each of said friction elements comprises a projection and said periphery comprises two parallel arms forming a groove, wherein said projection is in said groove, and wherein said pin extends through said two parallel arms and said projection.

14. The device as claimed in claim 12, wherein each of said friction elements comprises parallel flanges that extend on opposite sides of said periphery, and wherein said pin extends through said parallel flanges and said periphery.

15. The device as claimed in claim 12, further comprising a damping element between said friction elements and said periphery.

16. The device as claimed in claim 12, further comprising a finger at one end of each of said friction elements and an opening at an opposite end of said friction element for receiving said finger of an adjacent one of said friction elements to link said friction elements together.

17. A feed roller for feeding timber, the feed roller comprising:

a body having disposed around its periphery friction elements comprising anti-slip elements for engaging a log, said body having lugs in said periphery;

each of said friction elements being coupled to an adjacent one of said friction elements by a pin at one edge of said friction element and a slot at an opposite edge of said friction element, said pin of one said friction element engaging a slot of an adjacent one of said friction elements;

each of said friction elements having a bottom with grooves that engage said lugs to transfer rotational motion of the feed roller to the respective one of said friction elements;

each of said friction elements being arranged to turn around a pitch point that is substantially immobile in the radial direction of the feed roller, whereby each of said friction elements adhere to a surface of a log conveyed in the feed roller and directs an even pressure to the surface of the log.

* * * * *